(12) United States Patent
Noguchi et al.

(10) Patent No.: US 8,516,070 B2
(45) Date of Patent: Aug. 20, 2013

(54) COMPUTER PROGRAM AND METHOD FOR BALANCING PROCESSING LOAD IN STORAGE SYSTEM, AND APPARATUS FOR MANAGING STORAGE DEVICES

(75) Inventors: Yasuo Noguchi, Kawasaki (JP);
Kazutaka Ogihara, Kawasaki (JP);
Masahisa Tamura, Kawasaki (JP);
Yoshihiro Tsuchiya, Kawasaki (JP);
Tetsutaro Maruyama, Kawasaki (JP);
Takashi Watanabe, Kawasaki (JP);
Tatsuo Kumano, Kawasaki (JP);
Riichiro Take, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 12/552,887

(22) Filed: Sep. 2, 2009

(65) Prior Publication Data
US 2009/0320041 A1 Dec. 24, 2009

Related U.S. Application Data

(63) Continuation of application No. PCT/JP2007/055997, filed on Mar. 23, 2007.

(51) Int. Cl.
*G06F 15/16* (2006.01)

(52) U.S. Cl.
USPC .......................... 709/217; 709/218; 709/219

(58) Field of Classification Search
USPC .......................................... 709/217, 218, 219
See application file for complete search history.

(56) References Cited

U.S. PATENT DOCUMENTS

| | | | |
|---|---|---|---|
| 6,542,961 B1 | 4/2003 | Matsunami et al. | |
| 6,694,413 B1 | 2/2004 | Mimatsu et al. | |
| 7,010,663 B2 * | 3/2006 | George et al. | 711/209 |
| 7,509,454 B2 * | 3/2009 | Kano | 711/112 |
| 7,676,628 B1 * | 3/2010 | Compton et al. | 711/114 |

(Continued)

FOREIGN PATENT DOCUMENTS

| | | |
|---|---|---|
| JP | A 8-185275 | 7/1996 |
| JP | A 9-223047 | 8/1997 |

(Continued)

OTHER PUBLICATIONS

Office action issued in corresponding Japanese App. No. 2009-508753, dated Nov. 15, 2011.

(Continued)

*Primary Examiner* — Firmin Backer
*Assistant Examiner* — Jonathan Bui
(74) *Attorney, Agent, or Firm* — Greer, Burns & Crain, Ltd.

(57) ABSTRACT

In a distributed storage system, client terminals make access to virtual storage areas provided as logical segments of a storage volume. Those logical segments are associated with physical segments that serve as real data storage areas. A management data storage unit stores management data describing the association between such logical segments and physical segments. Upon receipt of access requests directed to a specific access range, a segment identification unit consults the management data to identify logical segments in the specified access range and their associated physical segments. A remapping unit subdivides the identified logical segments and physical segments into logical sub-segments and physical sub-segments, respectively, and remaps the logical sub-segments to the physical sub-segments according to a predetermined remapping algorithm. A data access unit executes the access requests based on the remapped logical sub-segments and physical sub-segments.

7 Claims, 10 Drawing Sheets

(56) References Cited

U.S. PATENT DOCUMENTS

| | | | |
|---|---|---|---|
| 2002/0091898 A1 | 7/2002 | Matsunami et al. | |
| 2002/0095549 A1 | 7/2002 | Matsunami et al. | |
| 2002/0103968 A1* | 8/2002 | Grover | 711/114 |
| 2003/0093439 A1 | 5/2003 | Mogi et al. | |
| 2003/0131207 A1 | 7/2003 | Arakawa et al. | |
| 2003/0191910 A1 | 10/2003 | Matsunami et al. | |
| 2004/0158673 A1 | 8/2004 | Matsunami et al. | |
| 2005/0033914 A1 | 2/2005 | Matsunami et al. | |
| 2005/0080810 A1 | 4/2005 | Matsuura | |
| 2005/0235132 A1* | 10/2005 | Karr et al. | 711/203 |
| 2006/0041729 A1* | 2/2006 | Rider et al. | 711/165 |
| 2006/0291542 A1* | 12/2006 | Medlock et al. | 375/148 |
| 2007/0271211 A1* | 11/2007 | Butcher et al. | 707/1 |
| 2008/0046679 A1* | 2/2008 | Bennett et al. | 711/207 |

FOREIGN PATENT DOCUMENTS

| | | |
|---|---|---|
| JP | A 2000-242434 | 9/2000 |
| JP | 2001-306407 | 11/2001 |
| JP | A 2002-500393 | 1/2002 |
| JP | 2003-140838 | 5/2003 |
| JP | A 2003-140836 | 5/2003 |
| JP | A 2003-150414 | 5/2003 |
| JP | A 2003-202964 | 7/2003 |
| JP | A 2004-145901 | 5/2004 |
| JP | A 2004-272324 | 9/2004 |
| JP | 2005-115438 | 4/2005 |
| JP | 2005-149436 | 6/2005 |
| JP | A 2006-24024 | 1/2006 |
| WO | WO 99/34291 A1 | 7/1999 |

OTHER PUBLICATIONS

Partial Translation of Figs. 4 and 7 of JP 09-223047 (JP 09-223047 submitted on Sep. 2, 2009).

Office Action issued by the Patent Office of Japan for corresponding JP Application No. 2009-508753, issued Jun. 12, 2010 (with English language translation).

* cited by examiner

1100 MANAGEMENT DATA

| STORAGE DEVICE ID | PHYSICAL SEGMENT ID | PHYSICAL SEGMENT STATUS | ASSOCIATED LOGICAL VOLUME ID | ASSOCIATED LOGICAL SEGMENT ID | ... |
|---|---|---|---|---|---|
| SN-A | 1 | PRIMARY | LVOL-A | 1 | |
| SN-A | 2 | PRIMARY | LVOL-A | 4 | |
| SN-B | 1 | PRIMARY | LVOL-A | 2 | |
| SN-C | 1 | PRIMARY | LVOL-A | 3 | |
| SN-D | 2 | PRIMARY | LVOL-A | 5 | |

FIG. 8A    LOGICAL SEGMENTS

|  | SUB-SEGMENT #0 | #1 | #2 | #3 | #4 | #5 | #6 | #7 |
|---|---|---|---|---|---|---|---|---|
| SEGMENT #0 | (0,0) | (0,1) | (0,2) | (0,3) | (0,4) | (0,5) | (0,6) | (0,7) |
| SEGMENT #1 | (1,0) | (1,1) | (1,2) | (1,3) | (1,4) | (1,5) | (1,6) | (1,7) |
| SEGMENT #2 | (2,0) | (2,1) | (2,2) | (2,3) | (2,4) | (2,5) | (2,6) | (2,7) |
| SEGMENT #3 | (3,0) | (3,1) | (3,2) | (3,3) | (3,4) | (3,5) | (3,6) | (3,7) |

FIG. 8B    PHYSICAL SEGMENTS

|  | SUB-SEGMENT #0 | #1 | #2 | #3 | #4 | #5 | #6 | #7 |
|---|---|---|---|---|---|---|---|---|
| SEGMENT #0 | (0,0) | (1,0) | (2,0) | (3,0) | (0,4) | (1,4) | (2,4) | (3,4) |
| SEGMENT #1 | (0,1) | (1,1) | (2,1) | (3,1) | (0,5) | (1,5) | (2,5) | (3,5) |
| SEGMENT #2 | (0,2) | (1,2) | (2,2) | (2,3) | (0,6) | (1,6) | (2,6) | (3,6) |
| SEGMENT #3 | (0,3) | (1,3) | (2,3) | (3,3) | (0,7) | (1,7) | (2,7) | (3,7) |

COMPUTER PROGRAM AND METHOD FOR BALANCING PROCESSING LOAD IN STORAGE SYSTEM, AND APPARATUS FOR MANAGING STORAGE DEVICES

This application is a continuing application, filed under 35 U.S.C. §111(a), of International Application PCT/JP2007/055997, filed Mar. 23, 2007.

FIELD

The embodiments described herein relate to a computer program and method for balancing the processing load in a storage system, as well as to an apparatus for managing storage devices.

BACKGROUND

A distributed storage system offers enhanced performance and reliability through the coordinated operation of a plurality of storage nodes distributed over a network. This distributed storage system provides a virtual volume (or logical volume) to permit the user to make access to storage spaces of the storage nodes in a unified manner, regardless of their physical locations. For management purposes, the logical storage area of a logical volume is divided into a plurality of smaller areas, called "logical segments." The logical volume is thus managed on a logical segment basis. Similarly, the storage space of a storage node is divided into a plurality of real data storage areas with the same size as the logical segments. Those storage areas are called "physical segments." Each logical segment of a logical volume is associated with at least one physical segment in a storage node. When data mirroring is implemented, a pair of physical segments in different storage nodes are associated with a single logical segment. To manage individual physical segments, the storage system has a management data area to store the identifiers of associated physical and logical segments, together with other management information.

Most storage systems use a static configuration for their operation. For example, the association between logical segments and physical segments is defined at the time of system installation, and that configuration will be used without changes, as will be the segment size. In such a static configuration, a group of logical segments including those with a high access frequency may happen to be assigned to physical segments located in a few particular storage nodes. If that is the case, the concentrated access to such logical segments could overload the corresponding storage nodes, thus slowing down their response to file read or write operations.

To address the above-discussed problem of uneven access to storage resources in a storage system, there is proposed a method for controlling a computer network configured as a storage system. Specifically, the proposed method dynamically changes the arrangement of physical segments as necessary to level out differences in the usage of storage resources. The method improves the response of the storage system, besides increasing the availability of storage resources. See for example, Japanese Laid-open Patent Publication No. 9-223047, FIG. 11.

Another proposed method allocates storage space for distributed storage devices, such as a disk array system formed from many drives. The proposed allocation method manages the allocation of storage capacity of those drives in such a way that as many drives as possible can operate simultaneously in a sequential write access. See, for example, Japanese Laid-open Patent Publication No. 8-185275, FIG. 1.

As described above, various techniques have been proposed to achieve faster access to storage nodes or to increase the throughput of distributed storage systems. Conventional distributed storage systems, however, are unable to control the concentration of load on a few particular storage nodes, as will be discussed below by way of example.

Figure 10:
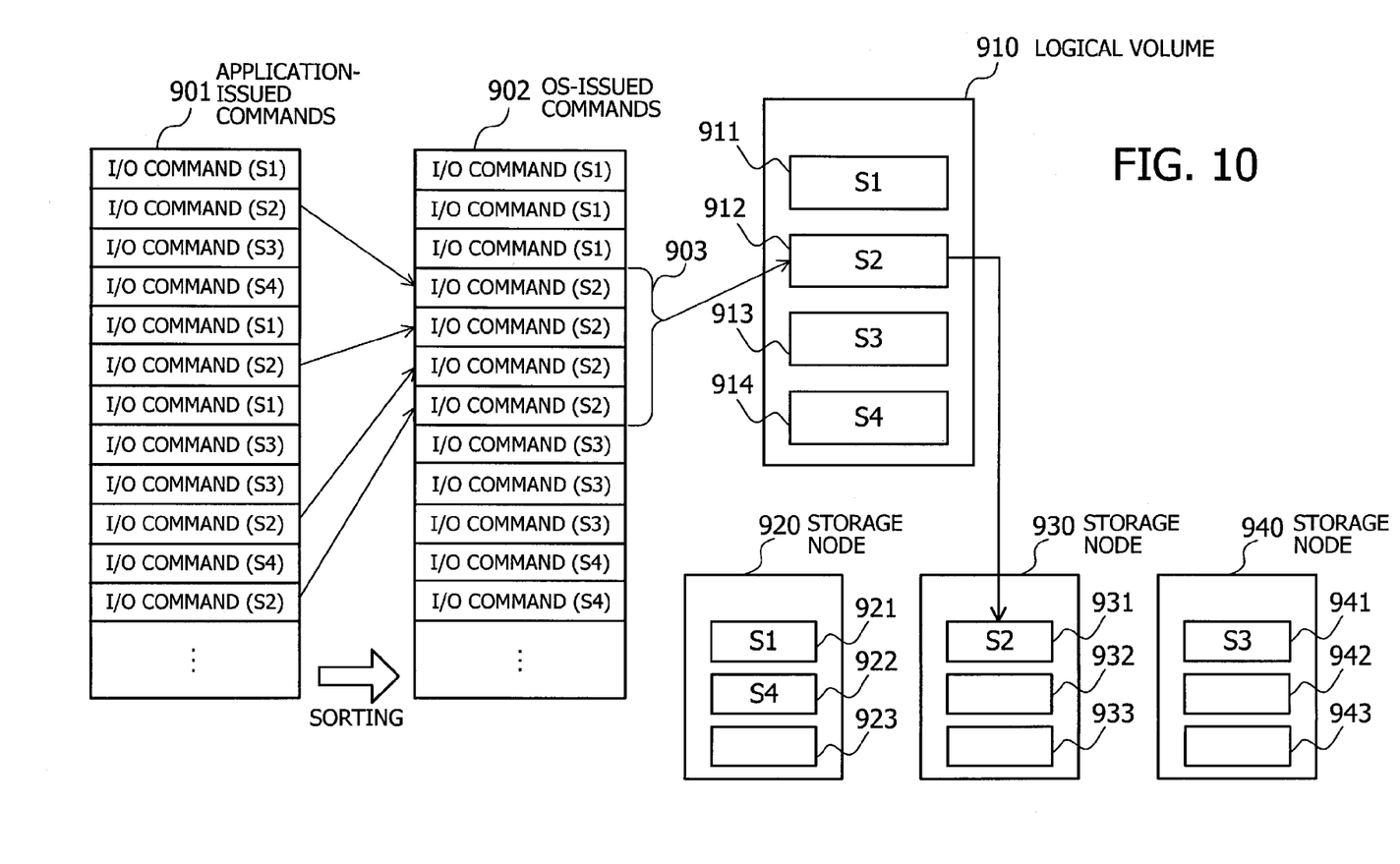
FIG. 10 illustrates how the sorting of I/O commands at the OS affects the load imposed on the storage nodes in a conventional storage system.

Operating system (OS) is the fundamental software that acts as a host for applications. An application produces various I/O commands requesting access to a logical volume. Upon receipt of such I/O commands, the OS issues those commands to storage nodes after sorting them. FIG. 10 illustrates how the sorting of I/O commands at the OS affects the load imposed on the storage nodes in a conventional storage system.

A logical volume 910 is formed from four logical segments 911, 912, 913, and 914 arranged in ascending order of address. These logical segments are distributed across several storage nodes 920 to 940. The storage space of a storage node 920 is divided into three physical segments 921 to 923. Likewise, the storage space of another storage node 930 is divided into three physical segments 931 to 933. The storage space of yet another storage node 940 is divided into three physical segments 941 to 943.

In the example of FIG. 10, each segment bears a label composed of the letter "S" and a numeral. A logical segment shares the same label with its corresponding physical segment. For example, logical segment S1 911 is mapped to physical segment S1 921, meaning that the substantive data of logical segment S1 911 actually resides in physical segment S1 921.

Applications, when executed, make random access to the logical volume by issuing I/O commands 901 (hereafter "application-issued commands"). FIG. 10 depicts such I/O commands, together with an indication of their destination logical segments in parentheses. For example, "I/O command (S1)" represents an access request to logical segment S1 911 in the logical volume 910. The OS saves application-issued commands 901 in a temporary storage area, or buffer, when they are received from applications. The OS sorts those I/O commands according to their destination addresses before they are issued sequentially to the storage system. The resulting I/O commands are referred to as "OS-issued commands," in contrast to the application-issued commands.

As a result of the sorting operation, the OS-issued commands 902 are now aligned in the order of destinations, ready to be sent out in that order. More specifically, the rearranged series of I/O commands begin with a group of I/O command (S1) addressed to logical segment S1 911. This is followed by a group of I/O commands (S2) addressed to logical segment S2 912, and then by a group of I/O commands (S3) addressed to logical segment S3 913. Take the group of I/O commands (S2), for example. This group consists of four I/O commands (S2) 903, which are issued consecutively to their destination physical segment 931 in the storage node 930. That is, four consecutive access requests concentrate in the physical segment 931, which may slow down the response from the corresponding storage node 930.

As mentioned earlier, performance improvement of storage systems has been desired, including faster response to an access request to physical volumes of storage nodes. Conventional approaches for achieving those goals are, however, all directed to segment-based management of storage volumes. As discussed above in FIG. 10, the conventional segment-based storage management is unable to solve the issue of longer response times and system slowdown due to the concentration of access requests to a small portion of a particular segment.

Reducing the segment size might alleviate the problem of access concentration to some extent. However, this approach also means an increased number of segments and, as a consequence, an increased amount of segment management data. Accordingly the storage system would need more time to spend for the management of such reduced-size segments.

SUMMARY

According to one aspect of the embodiments, there is provided a computer-readable storage medium storing a load balancing program for use in a storage system including a plurality of storage nodes interconnected by a network and storage devices coupled to each storage node. When executed on a computer, this load balancing program causes the computer to function as an apparatus including the following elements: a management data storage unit to store management data describing association between logical segments and physical segments, wherein the logical segments are virtual storage areas with a specified segment size into which a logical volume is divided, and wherein the physical segments are real data storage areas with the specified segment size into which storage space of the storage devices is divided; a segment identification unit, responsive to access requests directed to an access range of the logical volume, to identify the physical segments associated with the logical segments in the specified access range of the logical volume, based on the management data; a remapping unit to subdivide the logical segments in the access range into logical sub-segments with a specified sub-segment size, as well as the physical segments associated therewith into physical sub-segments with the specified sub-segment size, and to remap the logical sub-segments to the physical sub-segments according to a predetermined remapping algorithm; and a data access unit to execute the access requests based on the remapped logical sub-segments and physical sub-segments.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be described below with reference to the accompanying drawings, wherein like reference numerals refer to like elements throughout. The following description begins with an overview of an embodiment and then proceeds to more specific embodiments.

Figure 1:
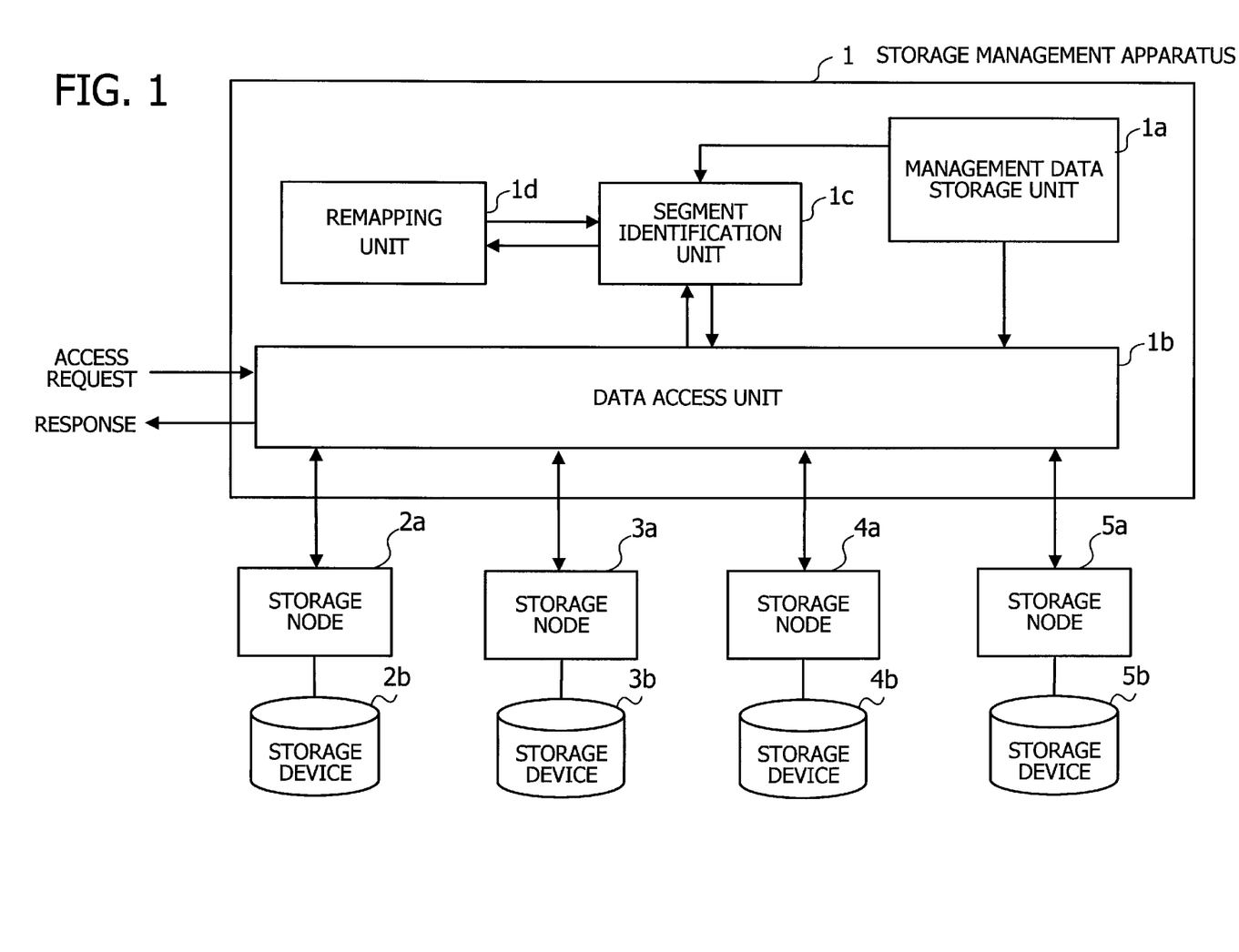
FIG. 1 illustrates a storage management apparatus according to an embodiment of the present invention.

FIG. 1 illustrates a storage management apparatus according to an embodiment of the present invention. The illustrated storage management apparatus 1 includes a management data storage unit 1a, a data access unit 1b, a segment identification unit 1c, and a remapping unit 1d. The storage management apparatus 1 manages data distributed in storage devices 2b, 3b, 4b, and 5b, which are under control of corresponding storage nodes 2a, 3a, 4a, and 5a. The illustrated functional blocks of the storage management apparatus 1 may be realized by a computer system which executes a load balancing program for a storage system.

Storage devices 2b, 3b, 4b, and 5b are attached to the storage nodes 2a, 3a, 4a, and 5a, respectively. The storage space of each storage device 2b, 3b, 4b, and 5b is divided into segments, each being as large as logical segments constituting a logical volume. The storage devices 2b, 3b, 4b, and 5b are managed on such a physical segment basis.

The management data storage unit 1a stores management data that describes the association between logical segments and physical segments. The storage system provides a virtual storage volume called a logical volume, which allows management of storage areas of distributed storage devices 2b, 3b, 4b, and 5b in a unified manner. The logical volume is divided into a plurality of logical segments with a specific size. Similar to the logical volume and logical segments, physical segments are defined by dividing each real data storage area of the storage devices 2b, 3b, 4b, and 5b into a number of segments.

As mentioned above, a set of management data is provided to associate physical segments with logical segments. Specifically, the management data is a collection of records each containing, for example, the identification information of a logical segment and its associated physical segment. Specifically, the identification information of a logical segment indicates (among other things) to which logical volume the logical segment belongs. Likewise, the identification information of a physical segment indicates (among other things) to which storage node the physical segment belongs. If there is no danger of confusion, the following sections of this description may use the term "segment" to refer to both logical and physical segments. This term may also be used when there is no need to draw an explicit distinction between logical segments and physical segments. Likewise, the term "sub-segment" may be used instead of "logical sub-segment" and "physical sub-segment" where appropriate.

The data access unit 1b handles access requests that arrive at the storage management apparatus 1 via a network or the like. Upon receipt of such access requests, the data access unit 1b identifies to which storage nodes 2a, 3a, 4a, and 5a those access requests are directed, and distributes the requests to the identified storage nodes to achieve the requested data access operations. The data access unit 1b also receives responses from the storage nodes 2a, 3a, 4a, and 5a and delivers the responses to the source of the access requests. To this end, the data access unit 1b delegates the task of identifying the destination segments of given access requests to a segment identification unit 1c (described later). The identified segments are then subjected to the remapping unit 1d (described later) to associate their sub-segments with physical sub-segments.

The data access unit 1b then executes the access requests by invoking an access control operation for each logical sub-segment and its corresponding physical sub-segment.

The segment identification unit 1c, responsive to access requests directed to a specific access range in the logical volume, consults relevant part of the management data in the management data storage unit 1a to identify the physical segments associated with the logical segments in that access range.

The remapping unit 1d subdivides the logical segments in the access range, as well as their associated physical segments identified by the segment identification unit 1c, into a predetermined number of smaller areas. Such subdivided areas of logical and physical segments are called "logical sub-segments" and "physical sub-segments," respectively. The remapping unit 1d remaps the resulting logical sub-segments to the physical sub-segments according to a predetermined algorithm. Any appropriate algorithm can be used for this purpose as long as it distributes constituent sub-segments of a logical segment across a plurality of physical segments. The remapping algorithm may be defined previously for each constituent entity of the storage system, including storage nodes 2a, 3a, 4a, and 5a.

The above-described storage management apparatus 1 operates as follows to achieve load balancing in a storage system.

The storage system allows its client to place a request for access to a logical volume. The data of the logical volume may be distributed over a plurality of storage devices 2b, 3b, 4b, and 5b. Accordingly, the storage management apparatus 1 is supposed to manage the data access by determining which storage nodes 2a, 3a, 4a, and 5a are relevant to the specified logical volume and forwarding access requests to the determined storage nodes.

The storage management apparatus 1 begins its operation in response to access requests from a client to a specific logical volume. Those access requests are directed to a specific access range in the logical volume. Upon receipt of such access requests, the segment identification unit 1c identifies physical segments associated with the logical segments in the access range in the logical volume. The segment identification unit 1c executes this task by consulting management data in the management data storage unit 1a. The remapping unit 1d subdivides each logical segment and its corresponding physical segment into logical sub-segments and physical sub-segments, respectively. Then according to a predetermined algorithm, the remapping unit 1d remaps the logical sub-segments to the physical sub-segments, such that the constituent sub-segments of a single logical segment will be distributed across those of multiple physical segments. Based on this remapping result, the data access unit 1b transfers the access requests to relevant storage nodes 2a, 3a, 4a, and 5a managing those physical sub-segments.

Each access request may either be for a data write operation or for a data read operation. In the case of a data write operation, the access request carries, or is accompanied by, write data addressed to a specific logical segment. The data access unit 1b divides the given write data into blocks with the same size as logical sub-segments and sends the resulting data blocks to the storage nodes 2a, 3a, 4a, and 5a that manage the destination physical sub-segments (i.e., physical sub-segments associated with the destination logical segment). The data access unit 1b may sort the data blocks in the order of their destination physical sub-segments and sends two or more blocks together to the intended storage node 2a, 3a, 4a, and 5a if those blocks are addressed to the same physical segment.

In the case of a data read operation, the data access unit 1b collects data blocks read out of physical sub-segments at relevant storage nodes 2a, 3a, 4a, and 5a. The data access unit 1b then combines the collected data blocks into a single piece of data as large as a single logical segment. Here, the collected data blocks are aligned in accordance with the association between the logical sub-segments and physical sub-segments that have been remapped by the remapping unit. If necessary, the data access unit 1b may further combine a plurality of such segment data into a chunk of read data corresponding to the access range, thus producing read data for delivery to the requesting client.

As can be seen from the above description, the storage management apparatus 1 handles a segment as a collection of smaller sub-segments, so that the data of a segment will be subdivided and distributed across a plurality of storage devices 2b, 3b, 4b, and 5b on a sub-segment basis. It should be noted that there is no need to save extra records describing the association between individual logical sub-segments and physical sub-segments since the above-described distributive remapping is performed based on a consistent rule. Accordingly, the storage management apparatus of the illustrated embodiment can distribute divided data blocks in different storage devices without increasing the amount of management data. While the OS and other software programs may make intensive access to a particular segment, the load imposed by such access would be balanced across the storage devices because the data is distributed on a sub-segment basis. This feature contributes to enhancement of data access performance.

Figure 2:
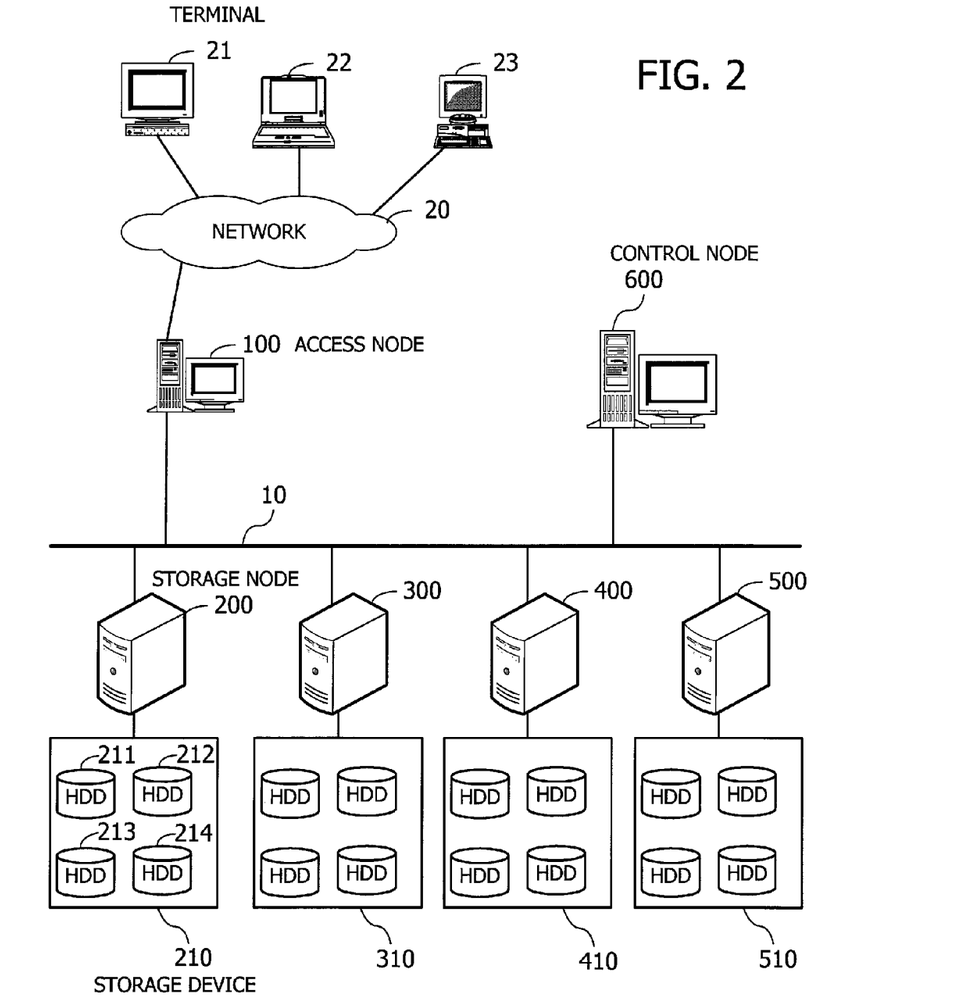
FIG. 2 illustrates a distributed storage system according to an embodiment.

Referring now to FIG. 2 and subsequent drawings, a distributed storage system according to an embodiment will be described in detail below. FIG. 2 illustrates a distributed storage system in which a plurality of self-contained storage nodes are deployed in separate locations. The illustrated system is built on a network 10 interconnecting an access node 100, a plurality of storage nodes 200, 300, 400 and 500, and a control node 600. Attached to the respective storage nodes 200, 300, 400, and 500 are storage devices 210, 310, 410, and 510.

The access node 100 is linked with a plurality of terminals 21, 22, and 23 via another network 20. The access node 100 has knowledge of the data storage locations that the storage nodes 200, 300, 400, and 500 are managing individually. Upon request from the terminals 21, 22, and 23, the access node 100 communicates with the storage nodes 200, 300, 400, and 500 to make read or write access. The present embodiment offers a storage management apparatus for use as the above-noted access node 100.

A storage device 210 contains a plurality of hard disk drives (HDDs) 211, 212, 213, and 214, which are configured as a RAID system, or Redundant Array of Independent Disks. Other storage devices 310, 410, and 510 are configured similarly to the storage device 210. The storage nodes 200, 300, 400, and 500 are computer systems based on a specific architecture, e.g., Intel Architecture (IA). Besides managing data stored in the attached storage devices 210, 310, 410, and 510, those storage nodes 200, 300, 400, and 500 provide the stored data to terminals 21, 22, and 23 via the network 10. The storage nodes 200, 300, 400, and 500 may be configured to serve as a redundant data storage system. In this case, the same data is mirrored on at least two storage nodes.

The control node 600 is deployed to manage the above storage nodes 200, 300, 400, and 500. For example, the control node 600 issues a patrol command to each storage node 200, 300, 400, and 500 at appropriate intervals.

Figure 3:
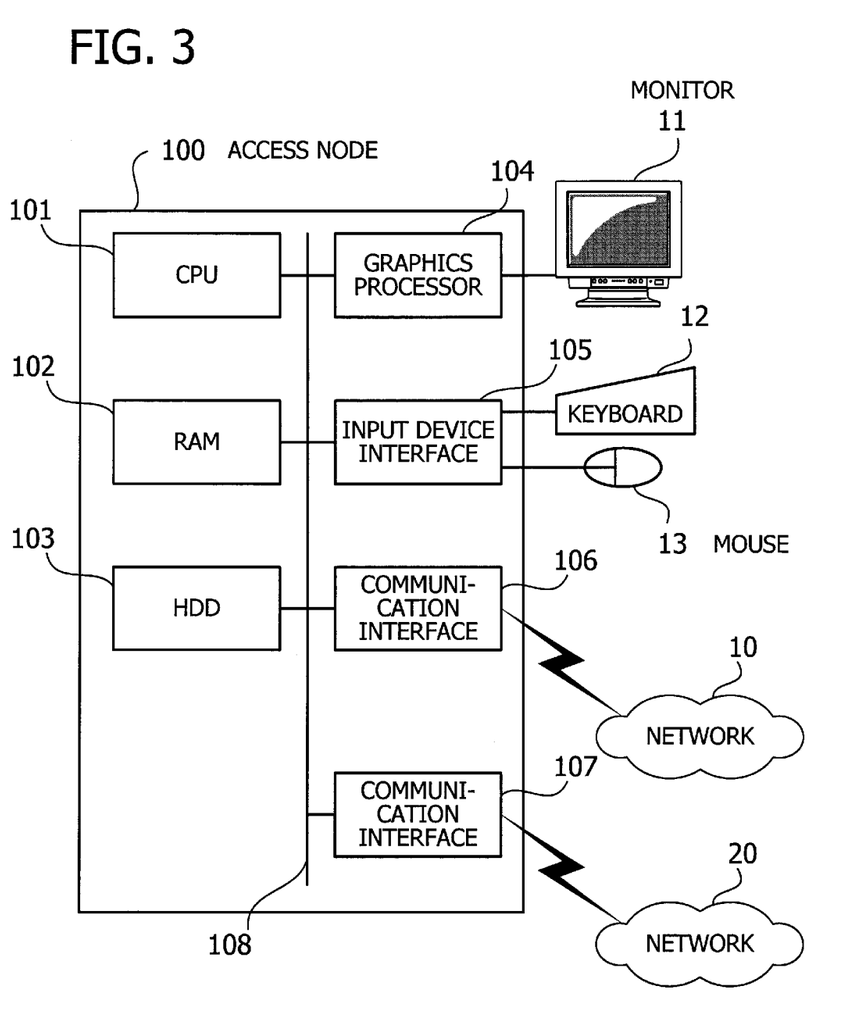
FIG. 3 illustrates an example hardware configuration of an access node used in the present embodiment.

FIG. 3 illustrates an example hardware configuration of the access node 100 used in the present embodiment. The illustrated access node 100 includes a central processing unit (CPU) 101, which controls the entire system of the access node 100, interacting with other components via a bus 108. Such components include: a random access memory (RAM) 102, an HDD 103, a graphics processor 104, an input device interface 105, and communication interfaces 106 and 107.

The RAM 102 serves as temporary storage for the whole or part of operating system (OS) programs and application programs that the CPU 101 executes, besides storing miscellaneous data objects manipulated at runtime. The HDD 103 stores program files of operating system and applications. The graphics processor 104 produces video images in accordance with drawing commands from the CPU 101 and displays them on the screen of a monitor 11 coupled thereto. The input device interface 105 is used to receive signals from external input devices, such as a keyboard 12 and a mouse 13. Those input signals are supplied to the CPU 101 via the bus 108. The communication interface 106 is connected to a network 10 to communicate with the storage nodes 200, 300, 400, and 500, control node 600, and other computers constituting a distributed storage system. The communication interface 107 is used to communicate with terminals 21, 22, and 23 via another network 20.

The above-described computer hardware serves as a platform for realizing the processing functions of the present embodiment. While FIG. 3 illustrates the access node 100 alone, the same or almost the same hardware configuration can be applied to the storage nodes 200, 300, 400, and 500, control node 600, and terminals 21, 22, and 23. The exception is that the storage nodes 200, 300, 400, and 500 may have an HDD interface, instead of a single HDD 103 seen in FIG. 3, to build a RAID storage system with a plurality of HDDs.

Referring back to FIG. 2, the illustrated access node 100, storage nodes 200, 300, 400, and 500, and control node 600 form a distributed storage system. From the viewpoint of terminals 21 to 23, this distributed storage system appears as one or more logical volumes.

Figure 4:
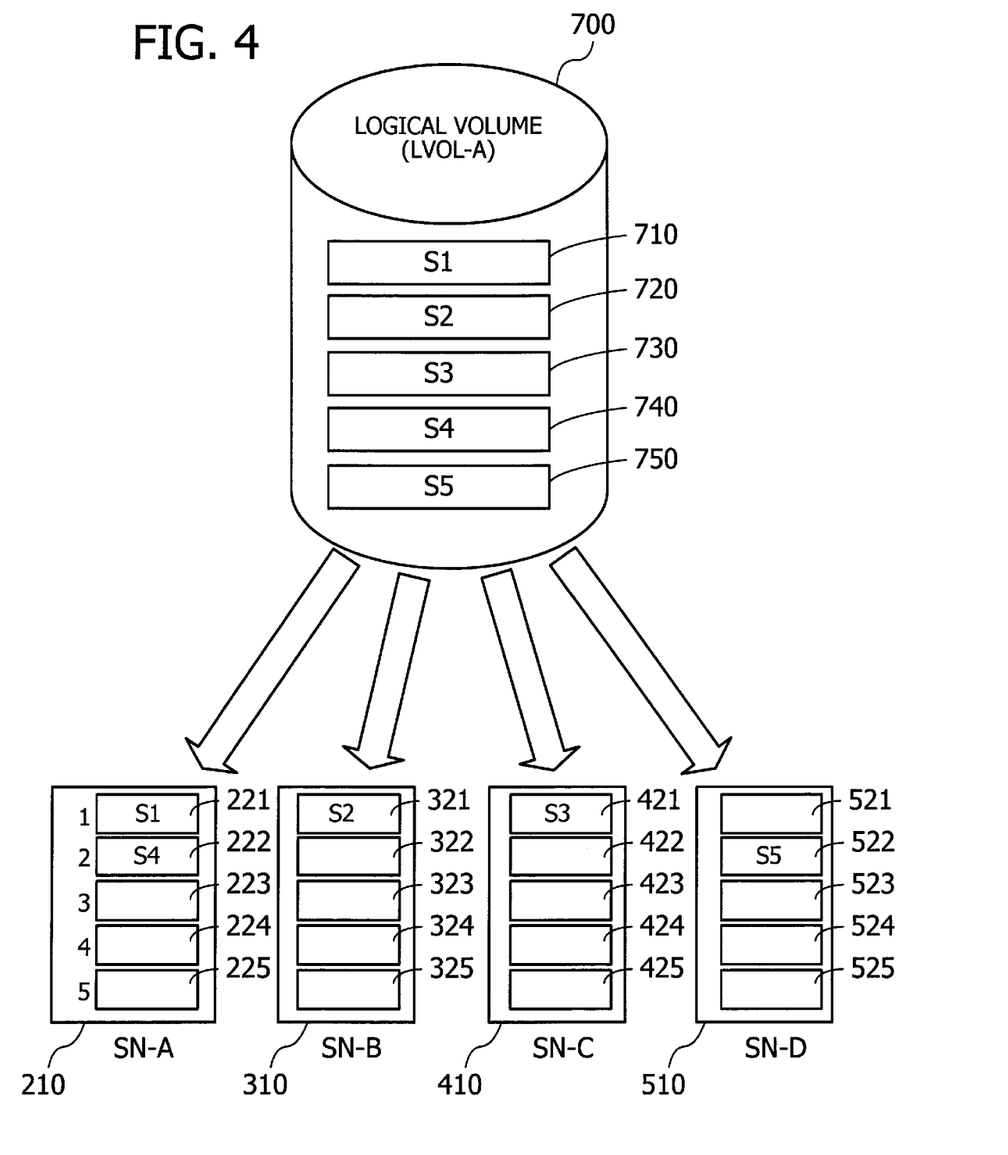
FIG. 4 illustrates a data structure of a logical volume.

FIG. 4 now illustrates an example data structure of a logical volume. The illustrated logical volume 700 bears an identifier "LVOL-A" (logical volume identifier). The logical volume 700 is formed from logical segments 710, 720, 730, 740, and 750. While not explicitly depicted in FIG. 4, four storage nodes 200, 300, 400, and 500 are connected via a network, as indicated by their respective node identifiers "SN-A," "SN-B," "SN-C," and "SN-D."

The storage nodes 200, 300, 400, and 500 manage their respective local storage devices 210, 310, 410, and 510, dividing each volume into multiple physical segments. For example, the first storage device 210 offers five physical segments 221 to 225 as its storage area. Likewise, the second storage device 310 offers five physical segments 321 to 325. The third storage device 410 offers five physical segments 421 to 425. The fifth storage device 510 offers five physical segments 521 to 525.

The storage capacity of individual logical segments 710, 720, 730, 740, 750 matches with that of individual physical segments managed in the storage devices 210, 310, 410, and 510. Suppose, for example, that each physical segment provides a capacity of one gigabytes (GB). In this case, each logical segment is also as large as 1 GB. The storage capacity of the logical volume 700 may be an integer multiple of the segment capacity, which is 5 GB in this example.

Referring to FIG. 4, each logical segment has an identifier that is composed of the letter "S" and a unique numeral. The numeric part represents the segment's position in the logical volume. For example, the identifier "S1" refers to the first logical segment 710 of the logical volume 700.

The constituent logical segments of the above-described logical volume 700 are each associated with one of the physical segments of the storage devices 210, 310, 410, and 510. In the example of FIG. 4, each logical segment and its associated physical segment share the same segment identifier. For example, the first logical segment "S1" 710 is associated with the first physical segment 221 of the first storage device 210. The storage devices 210, 310, 410, and 510 store and manage data of logical segments corresponding to their own physical segments.

Figure 5:
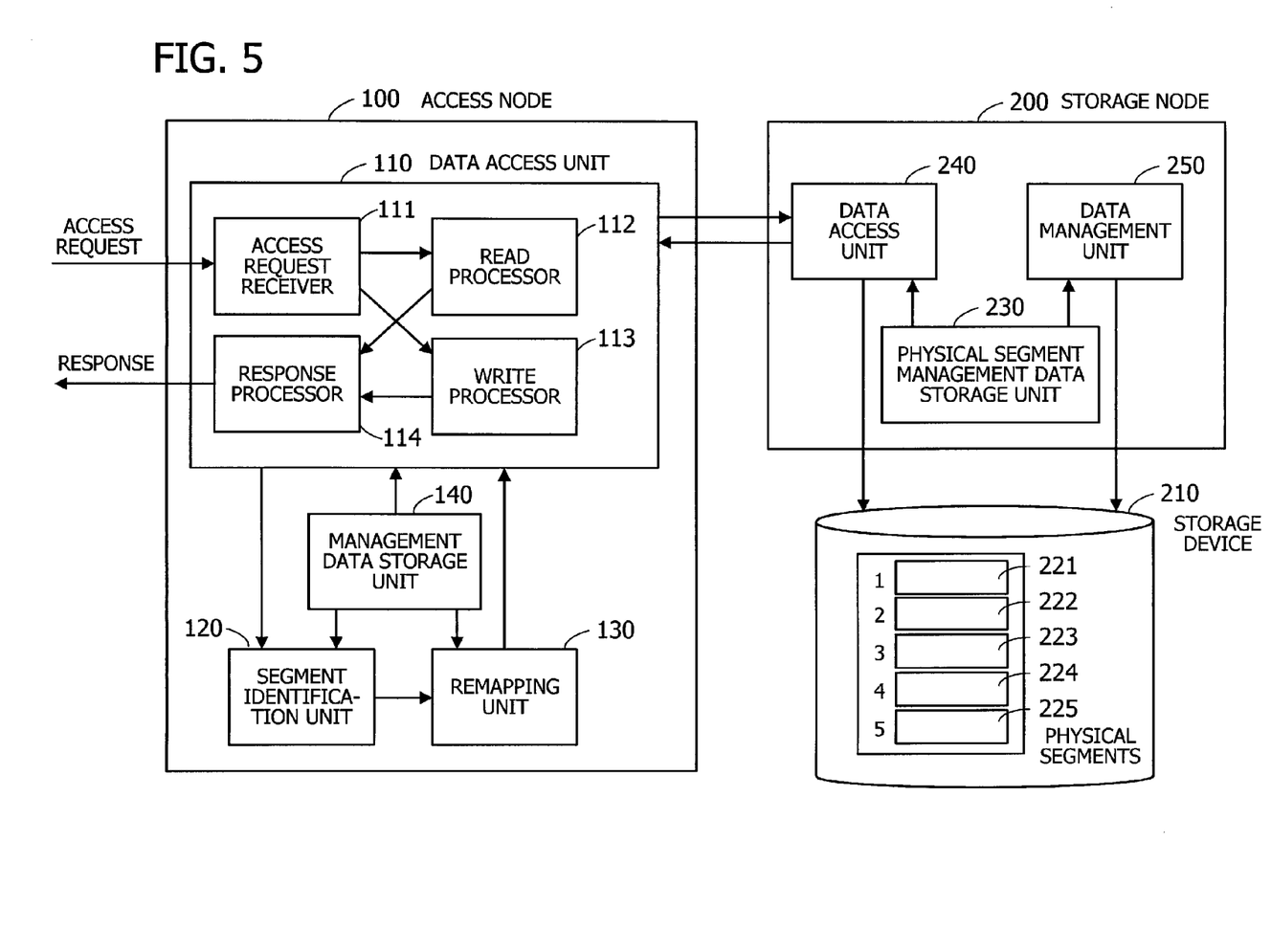
FIG. 5 is a block diagram illustrating functions of several devices involved in the distributed storage system according to the present embodiment.

FIG. 5 is a block diagram illustrating functions of several devices involved in the distributed storage system according to the present embodiment. Specifically, FIG. 5 focuses on an access node and a storage node.

The illustrated storage node 200 includes a physical segment management data storage unit 230, a data access unit 240, and a data management unit 250. The physical segment management data storage unit 230 stores physical segment management data for use in managing physical segments 221, 222, 223, 224, and 225 of a storage device 210. The details of this physical segment management data will be described later.

The data access unit 240 makes access to specific data in the storage device 210 in response to a request from the access node 100. Specifically, the access node 100 may issue a data read request. In response, the data access unit 240 reads specified data out of the storage device 210 and sends it back to the access node 100. The access node 100 may also issue a data write request. In this case, the data access unit 240 stores the specified write data into the storage device 210. Such read and write operations take place on an individual physical sub-segment basis.

The data management unit 250 manages data stored in the storage device 210. Specifically, the data management unit 250 performs data checking of a specified physical segment in the storage device 210 in response to a request from the control node 600 (FIG. 2). The data management unit 250 also provides, upon request, the control node 600 with physical segment management data stored in the physical segment management data storage unit 230. By sending such requests, the control node 600 collects physical segment management data from each storage node. The collected management data is then saved locally in the control node 600. The access node 100 may request the control node 600 for the stored management data. The access node 100 then saves the obtained management data in its own management data storage unit 140.

The access node 100 includes a data access unit 110, a segment identification unit 120, a remapping unit 130, and a management data storage unit 140. The data access unit 110 includes an access request receiver 111, a read processor 112, a write processor 113, and a response processor 114.

The access request receiver 111 handles access requests received from terminals 21, 22, and 23 by using the segment identification unit 120 and remapping unit 130 to associate logical sub-segments with physical sub-segments. The access request receiver 111 forwards each received access request to the read processor 112 or write processor 113 depending on whether the request is for a read operation or for a write operation. The read processor 112 produces a read request specifying which physical sub-segments should be read and issues the read request to the storage nodes accommodating those physical sub-segments. The read processor 112 then receives read data of the specified physical sub-segments from the storage nodes. The read processor 112 combines them into segment data. When the access range covers two or more segments, the read processor 112 repeats the above process for each requested segment and reproduces every segment data. The data reproduced in this way is then supplied to the response processor 114. In the case where the given access request is for a data write operation, the write processor 113 divides specified write data into blocks as large as logical sub-segments and sends a write request and those write data blocks to the storage nodes accommodating the destination physical sub-segments. When there is a response, the write processor 113 forwards it to the response processor 114. Upon receipt of read data from the read processor 112 or a write response from the write processor 113, the response processor 114 transmits it to the terminal that has issued the access request.

The segment identification unit 120 identifies physical segments corresponding to logical segments in the specified access range by consulting management data stored in the management data storage unit 140.

The remapping unit 130 remaps the logical sub-segments of each logical segment in the access range to physical sub-segments of the physical segments identified by the segment identification unit 120, according to a predetermined algorithm. Before this remapping operation, the first logical sub-segment of a logical segment is originally associated with the first physical sub-segment of a physical segment associated with the logical segment. Similarly, other constituent sub-segments of that logical segment are associated with their counterparts in the same physical segment. The remapping unit 130 distributes those logical sub-segments according to a remapping algorithm that remaps logical sub-segments constituting a logical segment to physical subsegments of a plurality of physical segments.

The above remapping operation associates constituent sub-segments of a logical segment with those of different physical segments. More specifically, a logical sub-segment is identified by some parameters such as the combination of a logical segment number and a logical sub-segment number. The logical segment number uniquely identifies a specific logical segment, whereas the logical sub-segment number is only unique within that logical segment. Likewise, physical sub-segments are identified by like parameters. Remapping of sub-segments may be implemented as a conversion of such identification parameters of logical sub-segments, so that those logical sub-segments will be associated with physical sub-segments identified by the converted parameters. This conversion of parameters will be discussed in detail later.

The management data storage unit 140 stores management data obtained from the control node 600. The access node 100 loads management data from the control node 600 when the system starts up, or when an access attempt to the storage node 200 is failed. Specifically, a part of the storage space of RAM 102 (FIG. 3) is allocated for use as the management data storage unit 140.

Figure 6:
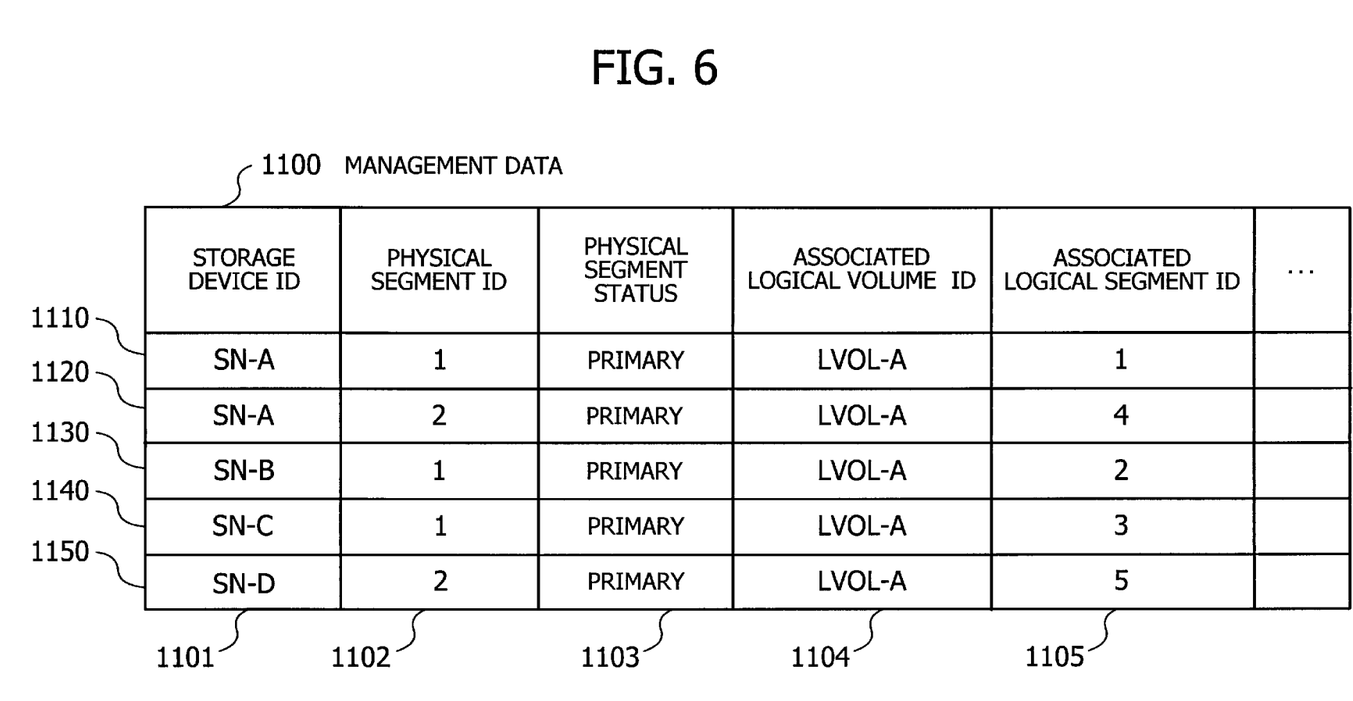
FIG. 6 depicts an example of management data according to the present embodiment.

FIG. 6 depicts an example of management data according to the present embodiment. The illustrated management data 1100 includes the following data fields: storage device ID 1101, physical segment ID 1102, physical segment status 1103, associated logical volume ID 1104, and associated logical segment ID 1105.

The storage device ID field 1101 contains a unique identifier (ID) of a storage device, and the physical segment ID field 1102 contains the identifier of a specific physical segment of that storage device. The physical segment status field 1103 provides status information of the physical segment. For example, this physical segment status field 1103 may contain a value of "primary" or "secondary" when the storage system is configured as redundant storage. In this case, two physical segments are assigned to one logical segment, one for active use ("primary") and the other for backup use ("secondary"). The physical segment status field 1103 may indicate some other condition of the physical segment depending on its role or operation. The associated logical volume ID field 1104 contains an identifier indicating to which logical volume the physical segment belongs. The associated logical segment ID field 1105 contains an identifier indicating to which logical segment the physical segment is assigned.

For example, the topmost entry of the management data 1100 indicates that the first physical segment of the storage device SN-A is working as part of the primary storage, being associated with the first logical segment of a logical volume named "LVOL-A." This entry of the management data 1100 represents the relationships between the logical and physical segments "S1" in FIG. 4. Other entries of the management data 1100 contain similar information for segment management purposes.

The above management data 1100 is compiled from management data that the control node 600 has collected from individual storage nodes 200, 300, 400, and 500. More specifically, the first entry 1110 and second entry 1120 have been collected from the first storage node 200. The third entry 1130 has been collected from the second storage node 300. The fourth entry 1140 has been collected from the third storage node 400. The fifth entry 1150 has been collected from the fourth storage node 500. The access node 100 obtains those pieces of management information from the control node 600 and saves it in its local management data storage unit 140. The illustrated management data 1100 enables the access node 100 to determine the association between physical segments and logical segments, as well as their locations.

Figure 7:
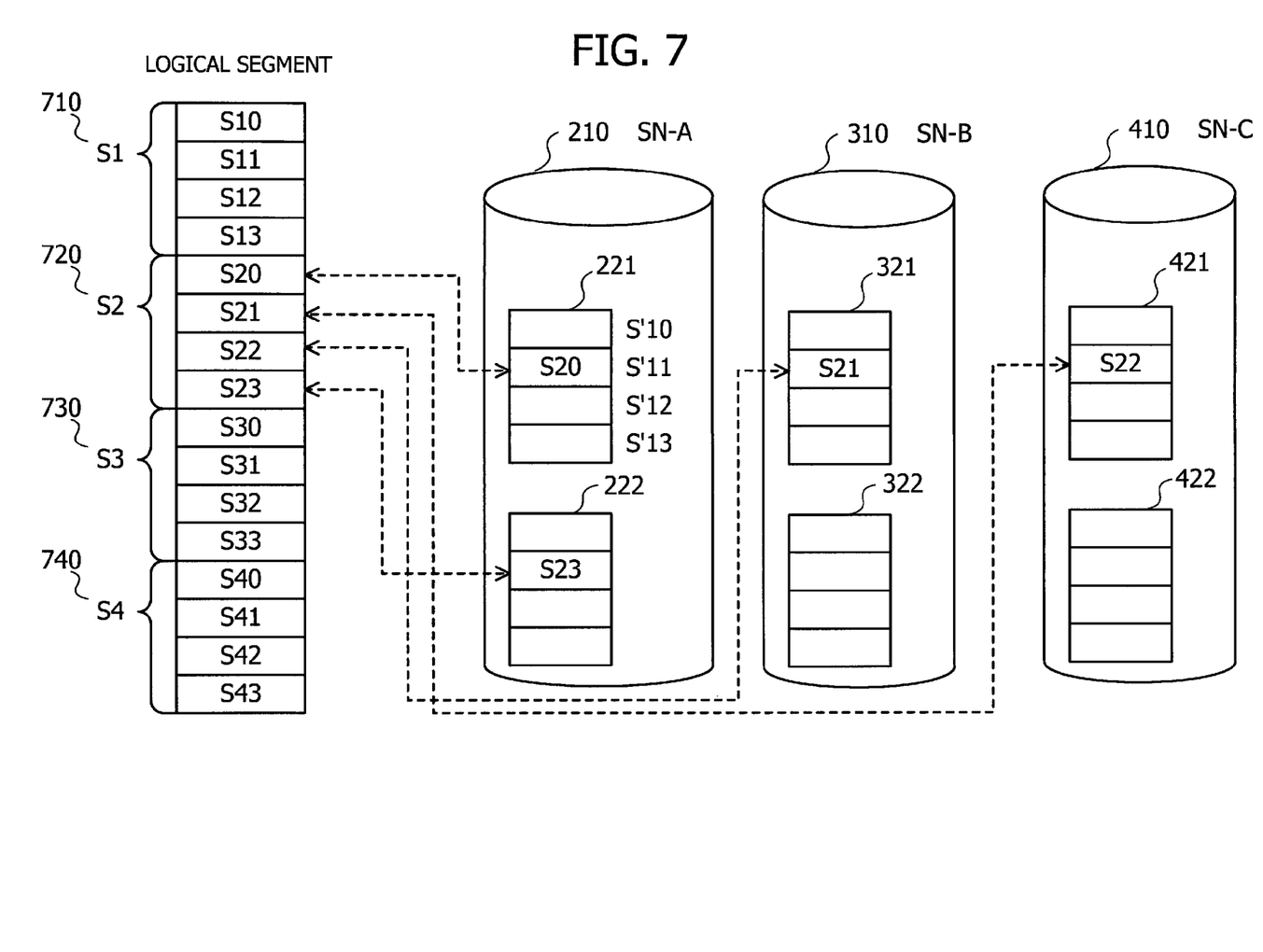
FIG. 7 depicts an example of a remapping operation.

Referring now to FIG. 7, a specific example of a remapping process will be described below. FIG. 7 illustrates a storage system including four logical segments S1 710, S2 720, S3 730, and S4 740 and three storage devices SN-A 210, SN-B 310, and SN-C 410. Logical segment S1 710 is associated with a physical segment 221 of SN-A 210. Logical segment S2 720 is associated with a physical segment 321 of SN-B 310. Logical segment S3 730 is associated with a physical segment 421 of SN-C 410. Logical segment S4 is associated with a physical segment 222 of SN-A 210.

Each logical segment is subdivided into four sub-segments, as is each physical segment. Specifically, logical segment S1 is subdivided into logical sub-segments S10 to S13. Likewise, logical segment S2 is subdivided into logical sub-segments S20 to S23. Logical segment S3 is subdivided into logical sub-segments S30 to S33. Logical segment S4 is subdivided into logical sub-segments S40 to S43. Further, the physical segment 221 corresponding to logical sub-segment S1 is subdivided into physical sub-segments S'10 to S'13. That is, logical sub-segments S10 to S13 constituting logical segment S1 are initially associated with physical sub-segments S'10 to S'13 constituting physical segment 221.

Suppose, for example, that the access requests specify four logical segments S1 to S4 as their access range. The distributive remapping process then associates a series of logical sub-segments <S10, S11, S12, S13, S20, S21, S22, S23 . . . S33, S40, S41, S42, S43> with a series of physical segments <S'10, S'20, S'30, S'40, S'11, S'21, S'31, S'41, . . . S'23, S'33, S'43> in that order, thus distributing the sub-segments constituting each logical segment to different physical segments. Referring to, for example, the second logical segment S2 720, its constituent sub-segments S20, S21, S22, and S23 are associated respectively with the second sub-segments of physical segments 221, 321, 421, and 222. As a result of this remapping, the load of data access will be distributed over the three storage devices 210, 310, and 410, thus achieving load balancing.

As mentioned earlier, this distributive remapping of sub-segments can be realized as a conversion a pair of parameters. One parameter is a segment number identifying a segment in the access range, and the other is a sub-segment number identifying a sub-segment. The conversion may be expressed as a couple of conversion formulas, as will be described below.

Figure 8A:
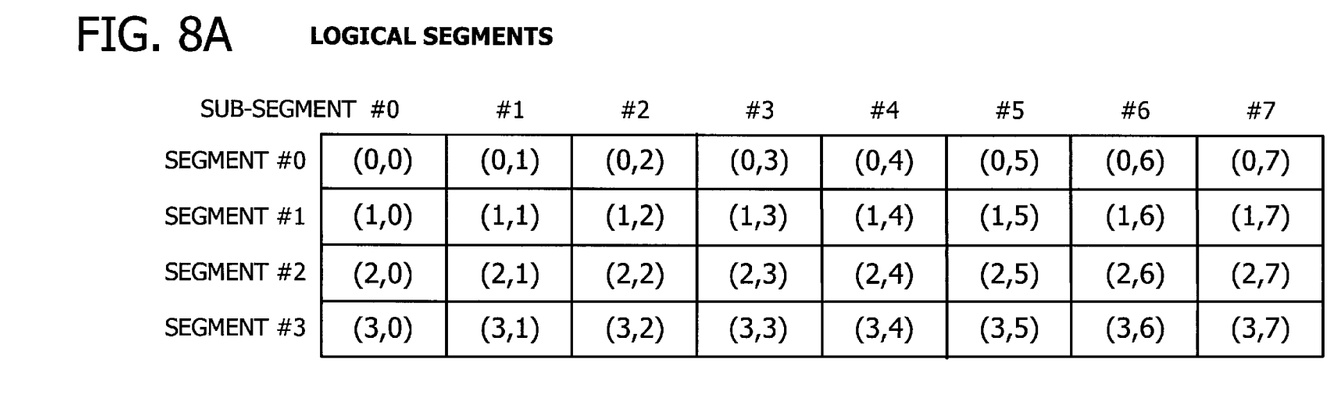
FIGS. 8A and 8B illustrate examples of sub-segment assignment according to the present embodiment.
Figure 8B:
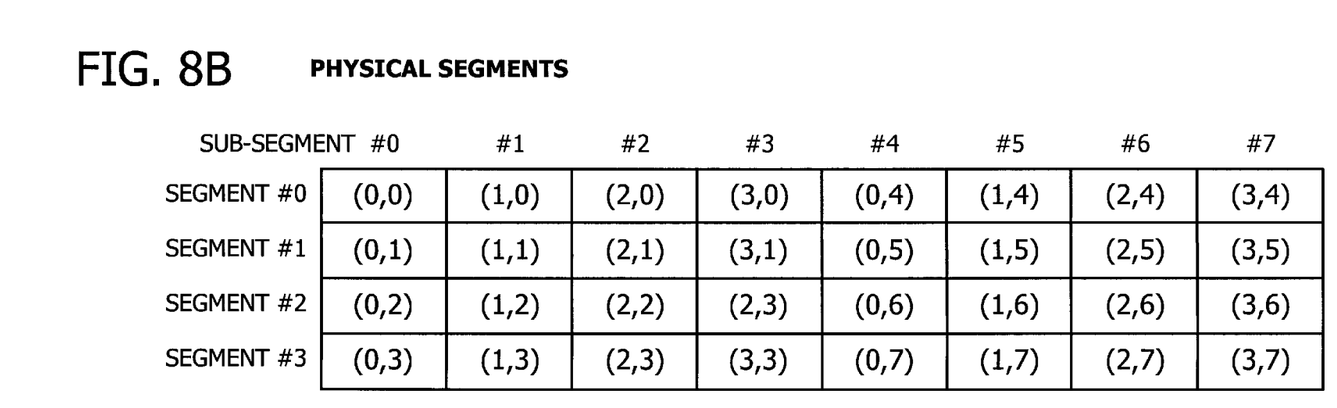

FIGS. 8A and 8B illustrate examples of assignment of sub-segments according to an embodiment. Let N be the number of segments, and M be the number of sub-segments into which a segment is subdivided. Sub-segments are supposed to be distributed across n segments, where n is an integer not greater than N or M (i.e., n>N and M>n). This number n is selected such that both N and M will be integer multiples of n.

Let (x, y) represent an array of logical sub-segments before remapping, where parameters x and y are segment number and sub-segment number, respectively. Likewise, let (x', y') represent an array of logical sub-segments after remapping, where parameters x' and y' are segment number and sub-segment number, respectively.

Then the conversion from a logical sub-segment (x, y) to a physical sub-segment (x', y') is given by the following two formulas:

$$x'=n*(x/n)+y \% n \quad (1)$$

$$y'=n*(y/n)+x \% n \quad (2)$$

where the symbols "/" and "%" represent the quotient and remainder of an integer division (e.g., x/n=0, x % n=2, y/n=0, y % n=0 for (x, y)=(2, 0) and n=4).

FIGS. 8A and 8B illustrate remapping of arrays of sub-segments in the case of n=4. Specifically, the columns of the illustrated arrays represent M subsegments, and the rows represent N segments. FIG. 8A depicts an original array of logical sub-segments. FIG. 8B depicts a remapped array of physical sub-segments.

In FIGS. 8A and 8B, the original logical sub-segments are represented in the above-noted form of (x, y) For example, (0, 0) refers to subsegment #0 of logical segment #0. The remapping process relocates those logical sub-segments from their original positions to new positions as depicted in FIG. 8B. That is, FIG. 8B illustrates a remapped array of physical sub-segments, where the content of each box indicates an associated logical sub-segment. For example, the above-mentioned logical sub-segment (0, 0) is found in the box representing sub-segment #0 of physical segment #0. Logical sub-segment (0, 1) is now found in the box representing sub-segment #0 of physical segment #1.

Referring to FIG. 8A, logical sub-segments (0, 0), (0, 1), (0, 2), (0, 3), (0, 4), (0, 5), (0, 6), and (0, 7) are all on the row of segment #0, meaning that they all belong to the same logical segment. Referring to FIG. 8B, the same logical sub-segments are now distributed to sub-segments #0 and #4 of four physical segments #0 to #3.

It should be noted that the above conversion formulas (1) and (2) are only an example, and it is not intended to limit the scope of the invention to that specific example.

It is also noted that the above embodiments may be modified in various ways. For example, the access node 100 may designate a specific logical sub-segment when it sends a data access request to the storage nodes 200, 300, 400, and 500. As another modification, the storage nodes may have a remapping unit, so that they can identify which sub-segments are relevant to requested segments.

Figure 9:
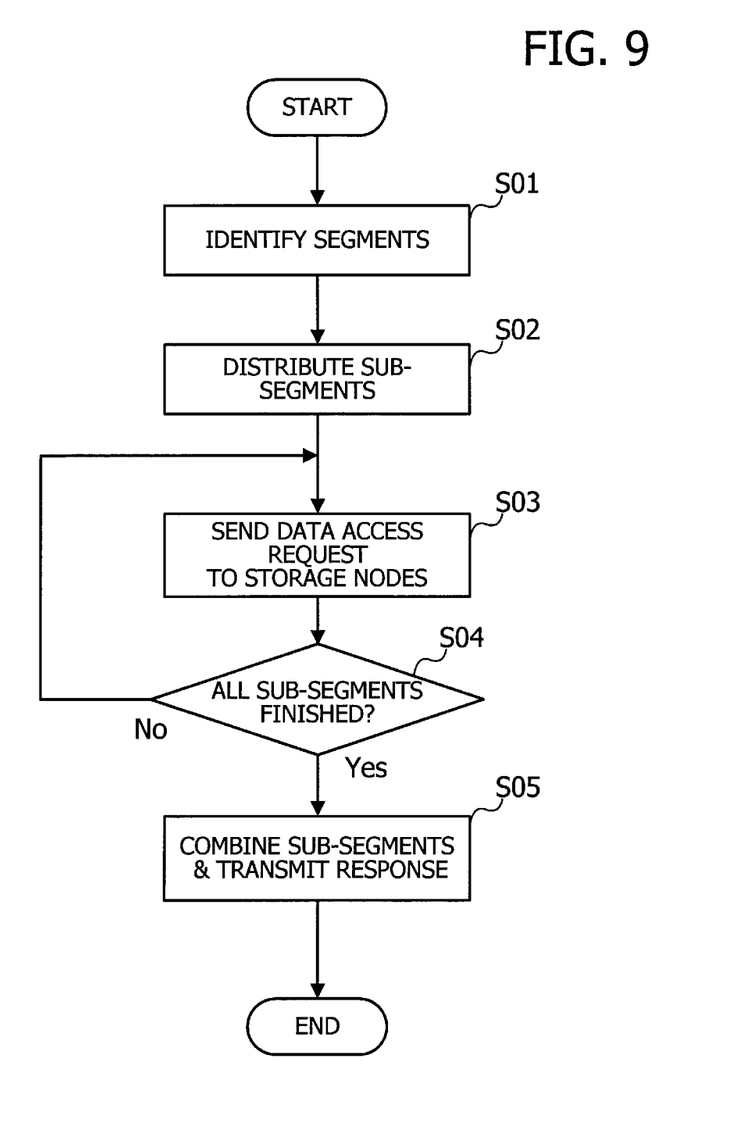
FIG. 9 is a flowchart of storage management according to an embodiment.

Referring now to the flowchart of FIG. 9, a storage management process according to an embodiment will be described below. When access requests arrive from a terminal via the network, the access node executes the following operation:

(step S01) Based on the received access requests, and by consulting management data stored in the management data storage unit 140, the access node determines to which logical segments the access requests are directed and identifies their associated physical segments.

(step S02) The access nodes subdivides each logical segment and its corresponding physical segment by a predetermined number, thereby producing logical sub-segments and physical sub-segments. Then, according to an appropriate remapping algorithm, the access node remaps the logical sub-segments to the physical sub-segments. This remapping algorithm distributes logical sub-segments constituting a logical segment to physical subsegments of a plurality of physical segments.

(step S03) The access node identifies storage nodes accommodating the physical sub-segments identified as being associated with the logical sub-segments through the remapping at step S02. The access node issues a data access request to each relevant storage node and receives a response.

(step S04) It is determined whether the above process has been done for all physical sub-segments corresponding to the specified logical sub-segments. If not, the access node goes back to step S03 to attend to unfinished segments or subsegments. If all is done, the access node proceeds to the next step.

(step S05) When the access requests are for a read operation, the access node combines sub-segment data blocks into segment data. If necessary, the access node further combines segment data with another. The access node then transmits a response, along with the resulting read data, to the requesting terminal. When the access requests are for a write operation, the access node forwards a response from the storage nodes to the requesting terminal.

The above processing steps permit the access node to accomplish access to a segmented storage volume while handling data on a sub-segment basis.

The above-described processing functions and methods may be implemented on a computer system. In that case, the instructions describing the functions of a storage management apparatus are encoded and provided in the form of computer programs. A computer system executes such programs to provide the above-described processing functions. The programs may be stored in a computer-readable storage medium for the purpose of storage and distribution. Suitable computer-readable storage media include magnetic storage devices, optical discs, magneto-optical storage media, semiconductor memory devices, and other types of tangible storage media. Magnetic storage devices include hard disk drives (HDD), flexible disks (FD), and magnetic tapes, for example. Optical disc media include digital versatile discs (DVD) DVD-RAM, compact disc read-only memory (CD-ROM), CD-Recordable (CD-R), and CD-Rewritable (CD-RW). Magneto-optical storage media include magneto-optical discs (MO), for example.

Portable storage media, such as DVD and CD-ROM, are suitable for distribution of program products. Network-based distribution of software programs may also be possible, in which case several master program files are made available on a server computer for downloading to other computers via a network.

A user computer stores necessary software components in its local storage device, which have previously been installed from a portable storage medium or downloaded from a server computer. The user computer executes those programs read out of the local storage device, thereby performing the programmed functions. Where appropriate, the user computer may directly execute program codes read out of the portable storage medium, without installing them in its local storage device. Also, the user computer may dynamically download programs from a server computer when they are demanded and executes them upon delivery.

According to the above-described embodiments, logical segments and their corresponding physical segments are respectively subdivided into logical sub-segments and physical sub-segments. The resulting sub-segments are remapped so that the data of an original segment will be distributed across a plurality of physical storage devices on a smaller sub-segment basis. While concentrated access may hit a particular logical segment, the load imposed by such access would be balanced across multiple storage devices. This feature contributes to enhancement of data access performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. A computer-readable, non-transitory storage medium storing a load balancing program for use in a storage system including a plurality of storage nodes interconnected by a network and storage devices coupled to each storage node, the load balancing program, when executed on a computer, causing the computer to execute a procedure comprising:

storing management data describing association between logical segments and physical segments, wherein the logical segments are virtual storage areas with a specified segment size into which a logical volume is divided, and wherein the physical segments are real data storage areas with the specified segment size into which storage space of the storage devices is divided;

identifying, responsive to access requests directed to an access range of the logical volume, the physical segments associated with the logical segments in the specified access range of the logical volume, based on the management data;

subdividing the logical segments in the access range into logical sub-segments with a specified sub-segment size, as well as the physical segments associated therewith into physical sub-segments with the specified sub-segment size;

remapping the logical sub-segments to the physical sub-segments according to a predetermined remapping algorithm in such a way that the physical sub-segments corresponding respectively to different logical sub-segments of a single logical segment are to be distributed in different physical segments; and executing the access requests based on the remapped logical sub-segments and physical sub-segments, wherein:
the remapping uses a pair of parameters, one parameter serving as a segment number to designate a logical segment or a physical segment, the other parameter serving as a sub-segment number to designate a logical sub-segment or a physical sub-segment, the remapping algorithm converts a first pair of parameter values to a second pair of parameter values according to a predetermined conversion rule, and the remapping associates a logical sub-segment designated by the first pair of parameter values with a physical sub-segment designated by the second pair of converted combinations.

2. The computer-readable, non-transitory storage medium according to claim 1, wherein:

the procedure further comprises storing subdivision parameters describing the number of physical segments to which the logical sub-segments are to be distributed and the number of logical sub-segments into which a logical segment is to be subdivided; and the remapping remaps the logical sub-segments to the physical sub-segments based on the subdivision parameters.

3. The computer-readable, non-transitory storage medium according to claim 1, wherein the the executing of the access requests includes issuing a data access request to each of the storage nodes that manage physical segments containing any of the physical sub-segments to which the logical subsegments have been remapped.

4. The computer-readable, non-transitory storage medium according to claim 3, wherein:

the storage nodes permit data access to the storage devices coupled thereto on a physical sub-segment basis;

the access requests require data read access to the logical volume; and the executing of the access requests includes reading data blocks of the physical sub-segments from the storage nodes to which the data access request has been issued, and aligning the collected read data blocks according to the association between the logical sub-segments and physical sub-segments that have been remapped.

5. The computer-readable, non-transitory storage medium according to claim 3, wherein:

the storage nodes permit data access to the storage devices coupled thereto on a physical sub-segment basis;

the access requests require data write access to the logical volume; and the executing of the access requests includes subdividing given write data into data blocks as large as the logical sub-segments and distributes the subdivided data blocks to the storage nodes that manage the physical sub-segments to which the logical subsegments have been remapped, together with the data access request specifying data write access.

6. A load balancing method executed by a computer in a storage system including a plurality of storage nodes interconnected by a network and storage devices coupled to each storage node, the load balancing method comprising:

storing management data describing association between logical segments and physical segments, wherein the logical segments are virtual storage areas with a specified segment size into which a logical volume is divided, and wherein the physical segments are real data storage areas with the specified segment size into which storage space of the storage devices is divided;

identifying, responsive to access requests directed to an access range of the logical volume, the physical segments associated with the logical segments in the specified access range of the logical volume, based on the management data;

subdividing the logical segments in the access range into logical sub-segments with a specified sub-segment size, as well as the physical segments associated therewith into physical sub-segments with the specified sub-segment size;

remapping the logical sub-segments to the physical sub-segments according to a predetermined remapping algorithm in such a way that the physical sub-segments corresponding respectively to different logical sub-segments of a single logical segment are to be distributed in different physical segments; and executing the access requests based on the remapped logical sub-segments and physical sub-segments, wherein:

the remapping uses a pair of parameters, one parameter serving as a segment number to designate a logical segment or a physical segment, the other parameter serving as a sub-segment number to designate a logical sub-segment or a physical sub-segment, the remapping algorithm converts a first pair of parameter values to a second pair of parameter values according to a predetermined conversion rule, and the remapping associates a logical sub-segment designated by the first pair of parameter values with a physical sub-segment designated by the second pair of converted combinations.

7. A storage management apparatus for managing data distributed in storage devices of a plurality of storage nodes interconnected by a network, the storage management apparatus comprising:

a management data storage unit to store management data describing association between logical segments and physical segments, wherein the logical segments are virtual storage areas with a specified segment size into which a logical volume is divided, and wherein the physical segments are real data storage areas with the specified segment size into which storage space of the storage devices is divided;

a segment identification unit, responsive to access requests directed to an access range of the logical volume, to identify the physical segments associated with the logical segments in the specified access range of the logical volume, based on the management data;

a remapping unit to subdivide the logical segments in the access range into logical sub-segments with a specified sub-segment size, as well as the physical segments associated therewith into physical sub-segments with the specified sub-segment size, and to remap the logical sub-segments to the physical sub-segments according to a predetermined remapping algorithm in such a way that the physical sub-segments corresponding respectively to different logical sub-segments of a single logical segment are to be distributed in different physical segments; and a data access unit to execute the access requests based on the remapped logical sub-segments and physical sub-segments, wherein:

the remapping unit uses a pair of parameters, one parameter serving as a segment number to designate a logical segment or a physical segment, the other parameter serving as a sub-segment number to designate a logical sub-segment or a physical sub-segment, the remapping algorithm converts a first pair of parameter values to a second pair of parameter values according to a predetermined conversion rule, and the remapping unit associates a logical sub-segment designated by the first pair of parameter values with a physical sub-segment designated by the second pair of converted combinations.

* * * * *